United States Patent
Drewes et al.

(10) Patent No.: US 9,863,830 B2
(45) Date of Patent: Jan. 9, 2018

(54) PRESSURE SENSOR HAVING A CERAMIC PLATFORM

(71) Applicant: Endress + Hauser GmbH + Co. KG, Maulburg (DE)

(72) Inventors: Ulfert Drewes, Mullheim (DE); Elke Schmidt, Bad Sackingen (DE); Thomas Uehlin, Schopfheim (DE); Andrea Berlinger, Baden-Baden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 15/303,241

(22) PCT Filed: Dec. 18, 2014

(86) PCT No.: PCT/EP2014/078599
§ 371 (c)(1),
(2) Date: Oct. 11, 2016

(87) PCT Pub. No.: WO2015/161904
PCT Pub. Date: Oct. 29, 2015

(65) Prior Publication Data
US 2017/0038270 A1    Feb. 9, 2017

(30) Foreign Application Priority Data

Apr. 23, 2014   (DE) .................. 10 2014 105 698

(51) Int. Cl.
*G01L 9/00*     (2006.01)
*C04B 37/02*    (2006.01)
(Continued)

(52) U.S. Cl.
CPC .......... *G01L 9/0075* (2013.01); *C04B 37/025* (2013.01); *C04B 37/026* (2013.01);
(Continued)

(58) Field of Classification Search
CPC .. G01L 9/12; G01L 7/00; B23K 31/02; B23K 31/00
(Continued)

(56) References Cited

U.S. PATENT DOCUMENTS

| 3,305,923 A | 6/1964 | Zimmer |
| 6,418,793 B1 | 7/2002 | Pechoux |

(Continued)

FOREIGN PATENT DOCUMENTS

| DE | 10314875 A1 | 11/2004 |
| DE | 10314910 A1 | 11/2004 |

(Continued)

OTHER PUBLICATIONS

German Search Report, German Patent Office, Munich, DE, dated Jul. 9, 2014.

(Continued)

*Primary Examiner* — Jewel V Thompson
(74) *Attorney, Agent, or Firm* — Bacon & Thomas, PLLC

(57) ABSTRACT

A pressure sensor, including a platform of ceramic, a measuring membrane arranged on the platform, a pressure measuring chamber enclosed in the platform under the measuring membrane, and at least one metal body connected with the platform via a pressure-tight, preferably elastomer free, mechanical connection. Thermomechanical stresses arising from the connection are reduced by features including that the pressure-tight, mechanical connection occurs via an adapting body arranged between the platform and the metal body. The adapting body has a thermal expansion coefficient, which rises in direction (z) extending from the platform to the metal body from a coefficient of expansion corresponding to a thermal coefficient of expansion of the ceramic of the platform to a coefficient of expansion corresponding to the thermal coefficient of expansion of the metal (Continued)

body, and the adapting body is connected by a first joint with the platform and by a second joint with the metal body.

40 Claims, 3 Drawing Sheets

(51) Int. Cl.
  *G01L 13/02* (2006.01)
  *G01L 19/00* (2006.01)
  *G01L 19/06* (2006.01)
  *G01L 19/04* (2006.01)
  *G01L 19/14* (2006.01)

(52) U.S. Cl.
  CPC .......... *G01L 9/0072* (2013.01); *G01L 13/025* (2013.01); *G01L 19/0007* (2013.01); *G01L 19/0046* (2013.01); *G01L 19/04* (2013.01); *G01L 19/0681* (2013.01); *G01L 19/14* (2013.01); *C04B 2235/665* (2013.01); *C04B 2237/04* (2013.01); *C04B 2237/10* (2013.01); *C04B 2237/12* (2013.01); *C04B 2237/122* (2013.01); *C04B 2237/127* (2013.01); *C04B 2237/32* (2013.01); *C04B 2237/343* (2013.01); *C04B 2237/365* (2013.01); *C04B 2237/40* (2013.01); *C04B 2237/406* (2013.01); *C04B 2237/58* (2013.01); *C04B 2237/708* (2013.01); *C04B 2237/72* (2013.01)

(58) Field of Classification Search
  USPC .................. 73/700, 718, 724; 228/121, 124.5
  See application file for complete search history.

(56) References Cited

U.S. PATENT DOCUMENTS

| | | | |
|---|---|---|---|
| 7,043,995 | B2 | 5/2006 | Mattmann |
| 9,054,222 | B2 * | 6/2015 | Tham ................... G01L 9/0073 |
| 9,136,662 | B2 * | 9/2015 | Rossberg ........... B23K 35/0222 |
| 9,624,137 | B2 * | 4/2017 | Elliot ................... C04B 37/006 |
| 2007/0214865 | A1 | 9/2007 | Nakae |
| 2017/0038270 | A1 | 2/2017 | Drewes |

FOREIGN PATENT DOCUMENTS

| | | |
|---|---|---|
| DE | 10348336 A1 | 5/2005 |
| DE | 102011006517 A1 | 10/2012 |
| DE | 102011085652 A2 | 5/2013 |
| DE | 102014119108 A1 | 10/2015 |
| EP | 2589845 A2 | 5/2013 |
| WO | 2014049119 A1 | 4/2014 |

OTHER PUBLICATIONS

International Search Report, EPO, The Netherlands, dated Jun. 12, 2015.
English Translation of the International Preliminary Report on Patentability, WIPO, Geneva, CH, dated Nov. 3, 2016.

* cited by examiner

US 9,863,830 B2

PRESSURE SENSOR HAVING A CERAMIC PLATFORM

TECHNICAL FIELD

The present invention relates to a pressure sensor having a platform of ceramic, a measuring membrane arranged on the platform, a pressure measuring chamber enclosed in the platform under the measuring membrane, and at least one metal body connected with the platform via a pressure-tight, mechanical connection.

BACKGROUND DISCUSSION

Pressure sensors having ceramic platforms are applied for measuring pressures. Among these pressure sensors are absolute pressure sensors, which measure the absolute pressure acting on the measuring membrane relative to vacuum, relative pressure sensors, which measure the pressure acting on the measuring membrane relative to a reference pressure, such as e.g. the current atmospheric pressure, supplied to the pressure measuring chamber, as well as pressure difference sensors, which register a pressure difference between a first pressure acting on a first side of the measuring membrane and a second pressure acting on a second side of the measuring membrane.

Pressure sensors are widely applied in almost all fields of industrial measurements technology. Ceramic platforms offer the advantage that they are not only thermally, chemically and mechanically very resistant, but also have a very high pressure resistance. Pressure sensors having ceramic platforms must be mounted at the location of use and be supplied via corresponding process connections or pressure supply lines, depending on sensor type, with the pressure to be measured, the pressure to be measured plus the reference pressure, respectively the two pressures, whose difference is to be measured.

For this, pressure sensors are applied e.g. in housings equipped with process connections, or in another manner connected with process connections and/or pressure supply lines. Housings, process connections and pressure supply lines are regularly built of metal, e.g. stainless steel.

The ceramic platform is, thus, regularly mechanically connected with at least one metal body via a pressure-tight connection.

In such case, there is the problem that ceramic has a thermal coefficient of expansion, which significantly differs from the thermal coefficient of expansion of the usually installed metal body. Ceramic materials have a thermal coefficient of expansion, which typically lies in the order of magnitude from 5 ppm/K to 8 ppm/K. In contrast, stainless steels have a clearly higher thermal coefficient of expansion in the order of magnitude above 16 ppm/K.

SUMMARY OF THE INVENTION

While pressure-tight mechanical combinations of elements having at least similar thermal coefficients of expansion can be implemented by joints, such as e.g. welds, solderings or adhesions, there occur in the case of joints between elements with different thermal coefficients of expansion thermomechanical stresses, which load the joint and in the worst case can even lead to destruction of the joint. Thermomechanical stresses are greater, the greater the temperature range is, in which the elements are applied. Accordingly, pressure sensors having metal ceramic joints can, at most, be applied in a very limited temperature range.

Moreover, thermomechanical stresses arising from metal to ceramic joints in the region or vicinity of the measuring membrane can bring about warping of the measuring membrane, which, in turn, can degrade the accuracy of measurement of the pressure sensor. In contrast, mechanical clampings with interpositioning of elastic elements, such as, for example, elastomeric seals, result in clearly smaller thermomechanical stresses. This form of pressure-tight mechanical connection is, however, as a rule, only applicable for clamping ceramic pressure measurement cells in a housing, while, in contrast, it is, as a rule, unsuitable for the connection of pressure supply lines to bores extending through the ceramic platform to the pressure measuring chamber. Moreover, elastomers age and must be replaced when they wear out.

It is an object of the invention to provide a pressure sensor having a platform of ceramic and at least one metal body connected with the platform via a pressure-tight, preferably elastomer free, mechanical connection, in the case of which thermomechanical stresses arising from the connection are as small as possible.

For this, the invention resides in a pressure sensor, including:
a platform of ceramic;
a measuring membrane arranged on the platform;
a measuring chamber enclosed in the platform under the measuring membrane pressure; and
at least one metal body connected with the platform via a pressure-tight, mechanical connection, and is characterized in that
the pressure-tight, mechanical connection includes an adapting body arranged between the platform and the metal body;
the adapting body has a thermal expansion coefficient, which rises along the adapting body in direction extending from the platform to the metal body from a coefficient of expansion corresponding to a thermal coefficient of expansion of the ceramic of the platform to a coefficient of expansion corresponding to the thermal coefficient of expansion of the metal body; and
the adapting body is connected by a first joint with the platform and by a second joint with the metal body.

A further development of the invention is characterized in that:
the adapting body has layers of different composition arranged one on top of the other, especially layers applied on top of one another by laser sintering of powder layers containing metal and/or ceramic fractions; and
the layers have a ceramic fraction, which is greater than or equal to 0% and less than or equal to 100%, and have a metal fraction, which is greater than or equal to 0% and less than or equal to 100%, wherein:
the ceramic fraction decreases from layer to layer in direction extending from the platform to the metal body; and
the metal fraction rises from layer to layer in direction extending from the platform to the metal body.

Another further development of the invention is characterized in that:
the adapting body is a sintered body constructed of layers, and the first joint is a joint formed by sintering, especially by laser sintering, to the platform an outermost layer of the adapting body facing the platform; or
the first joint is an active hard soldered or brazed joint, especially an active hard soldered or brazed joint formed by means of a ternary active hard solder or braze having a Zr—Ni-alloy and titanium; or the first joint is a glass soldered joint.

In an additional further development, the second joint is a welded joint or a glass soldered joint.

A first variant of the invention is characterized in that:
the measuring membrane is composed of metal and is one of the metal bodies; and
an outer edge of an end of the platform facing the measuring membrane is connected via the first joint, the adapting body and the second joint with an outer edge of the side of the measuring membrane facing the platform.

In an embodiment of the first variant:
the adapting body is an annular adapting body of rectangular cross section; or
an end of the platform facing the measuring membrane includes a region formed as a membrane bed, and the adapting body includes an inner contour, which externally surrounds the pressure measuring chamber and by which the membrane bed is outwardly continued.

A second variant of the invention is characterized in that:
a traversing bore is provided in the platform, opening into the pressure measuring chamber;
a pressure supply line is provided connected to the bore;
the pressure supply line has on its end facing the platform a metal termination having a passageway and forming one of the metal bodies;
the platform is connected via the first joint, the adapting body and the second joint with the termination; and
the adapting body has an interior, through which an interior of the bore is connected via the passageway in the termination with an interior of the pressure supply line.

A third variant of the invention is characterized in that:
the platform is arranged in a housing;
the housing includes a housing segment externally enclosing the platform and spaced from the platform, and a shoulder connected with the housing segment, extending radially inwardly, and forming one of the metal bodies of metal, especially stainless steel, especially nickel containing, austenitic, stainless steel; and
an inner edge of the shoulder is connected via the pressure-tight connection with an outer edge of the platform facing the shoulder, wherein:
an end of the adapting body facing the platform is connected via the first joint with an outer edge of the end of the platform facing the shoulder; and
an end of the adapting body facing the shoulder is connected via the second joint with a side of an inner edge of the shoulder, which side faces into the housing.

A further development of the third variant provides that:
the measuring membrane is composed of ceramic;
an outer edge of the measuring membrane is connected via a pressure-tight connection with a side of the inner edge of the shoulder, which side faces away from the platform;
the pressure-tight connection occurs via an additional adapting body, especially an additional adapting body formed identically to the adapting body arranged between platform and shoulder;
the additional adapting body has a thermal expansion coefficient, which in direction extending from the measuring membrane to the shoulder rises from a coefficient of expansion corresponding to a thermal coefficient of expansion of the ceramic of the measuring membrane to a coefficient of expansion corresponding to the thermal coefficient of expansion of the metal of the shoulder; and the additional adapting body has an end facing the measuring membrane and connected with the measuring membrane by a first joint, especially a joint formed by sintering an outer layer of the adapting body to the measuring membrane, and an end facing the shoulder and connected with the shoulder by a second joint, especially a welded joint.

In a further development of the third variant or its further development, the shoulder is elastic in direction extending parallel and/or perpendicular to the surface normal to the measuring membrane.

In a preferred embodiment of the invention:
the adapting body is an adapting body constructed of layers; and
the number of layers is greater than or equal to a difference between the thermal coefficient of expansion of the metal body and the thermal coefficients of expansion of the ceramic platform divided by 2 ppm/K, especially greater than or equal to the difference divided by 1 ppm/K, especially greater than or equal to twice the difference divided by 1 ppm/K.

In an additional preferred embodiment:
the adapting body is an adapting body constructed of layers; and
the layers have a layer thickness of not less than 10 μm, especially not less than 20 μm, especially not less than 40 μm, and no greater than 400 μm, especially no greater than 200 μm, especially no greater than 100 μm.

Additionally, the invention resides in a method for manufacture of the adapting body of the pressure sensor of the invention, which method is characterized in that:
the individual layers are produced by applying a powder layer in mixed form containing metal powder and ceramic powder in a mixing ratio corresponding to the composition of the respective layer, and solidifying by laser sintering; or
the individual layers are produced by applying an amount of metal powder corresponding to the composition of the respective layer and an amount of ceramic powder corresponding to the composition of the respective layer, in each case, as powder layers one on top of the other, and the two powder layers are mixed and solidified by laser sintering.

A preferred embodiment of the pressure sensor of the invention is characterized in that:
the adapting body has in direction extending from the platform to the metal body a height, and perpendicular thereto a width; and
a product of a ratio of the width of the adapting body to the height of the adapting body and the magnitude of the difference between the thermal coefficients of expansion of the ceramic of the platform and the metal of the metal body is less than a constant of units 1/K, wherein:
the constant is less than 0.1%/K, especially less than 500 ppm/K, especially less than 250 ppm/K, especially less than 125 ppm/K, especially less than 60 ppm/K; and/or
the constant equals a quotient of a dimensionless deformation parameter and a temperature difference between a maximum and a minimum temperature, for which the pressure sensor is to be applied, and the deformation parameter is less than 4%, especially less than 2%, especially less than 1%.

A preferred embodiment of the pressure sensor of the invention is characterized in that:
the adapting body is an adapting body constructed of layers arranged on top of one another;

the individual layers, in each case, have a layer thickness extending parallel to the surface normal of the layer and a width extending perpendicular to the surface normal of the layer; and the product of the ratio of the width of the respective layer to its layer thickness and the magnitude of the difference between the thermal coefficients of expansion of the layers adjoining this layer is less than a constant with the units 1/K, wherein:

the constant is less than 0.1%/K, especially less than 500 ppm/K, especially less than 250 ppm/K, especially less than 125 ppm/K, especially less than 60 ppm/K; and/or the constant equals a quotient of a dimensionless deformation parameter and a temperature difference between a maximum and a minimum temperature, for which the pressure sensor is to be applied, and the deformation parameter is less than 4%, especially less than 2%, especially less than 1%.

Additionally, the invention resides in a pressure sensor of the invention, in the case of which the adapting body:

is a sintered body manufactured by sintering a green body manufactured in a screen printing process; and is composed of layers arranged one on top of the other, especially layers having a layer thickness in the order of magnitude of a few micrometers;

which have either a ceramic fraction lessening from layer to layer in direction extending from the platform to the metal body and a metal fraction increasing from layer to layer in direction extending from the platform to the metal body; or which are arranged on top of one another in superimposed layer sequences either exclusively of metal or exclusively of ceramic, wherein a number of the layers in the individual layer sequences containing exclusively ceramic and a number of the layers in the individual layer sequences containing exclusively metal is predetermined in such a manner that a ceramic fraction of the layer sequences decreases from layer sequence to layer sequence in direction extending from the platform to the metal body and a metal fraction of the layer sequences rises from layer to layer in direction extending from the platform to the metal body.

A further development of the latter pressure sensor provides that the first and second joints are joints produced by sintering the green body arranged between the platform and metal body.

The invention includes the advantage that the different thermal coefficients of expansion of metal body and ceramic platform are transitioned into one another step-wise via the adapting body. This effects a significant reduction of temperature dependent stresses caused by the different coefficients of expansion of metal body and ceramic platform, both within the connection effected via the adapting body, as well as also in the regions of the pressure sensor adjoining the connection.

Since platform and metal body each adjoin an end of the adapting body, which end has a thermal coefficient of expansion corresponding to the thermal coefficient of expansion of the respective platform, body, the joints between adapting body and platform, as well as between adapting body and metal body, in each case, connect interfaces with equal or at least very similar thermal coefficients of expansion. Accordingly, the joints are exposed to only very small temperature dependent loadings. The pressure sensors of the invention can, thus, be applied durably in a comparatively large temperature range, especially in a temperature range from −40° C. to +130° C. The use of elastomers, and the experiencing of the disadvantages associated therewith, is not required.

BRIEF DESCRIPTION OF THE DRAWINGS

The invention and its advantages will now be explained in greater detail starting from the figures of the drawing, in which three examples of embodiments are shown. Equal elements are provided in the figures with equal reference characters. The figures of the drawing show as follows.

DETAILED DISCUSSION IN CONJUNCTION WITH THE DRAWINGS

The invention relates to pressure sensors having a platform of ceramic, a measuring membrane arranged on the platform, a pressure measuring chamber enclosed in the platform under the measuring membrane, and at least one metal body connected with the platform via a pressure-tight, mechanical connection.

Figure 1:
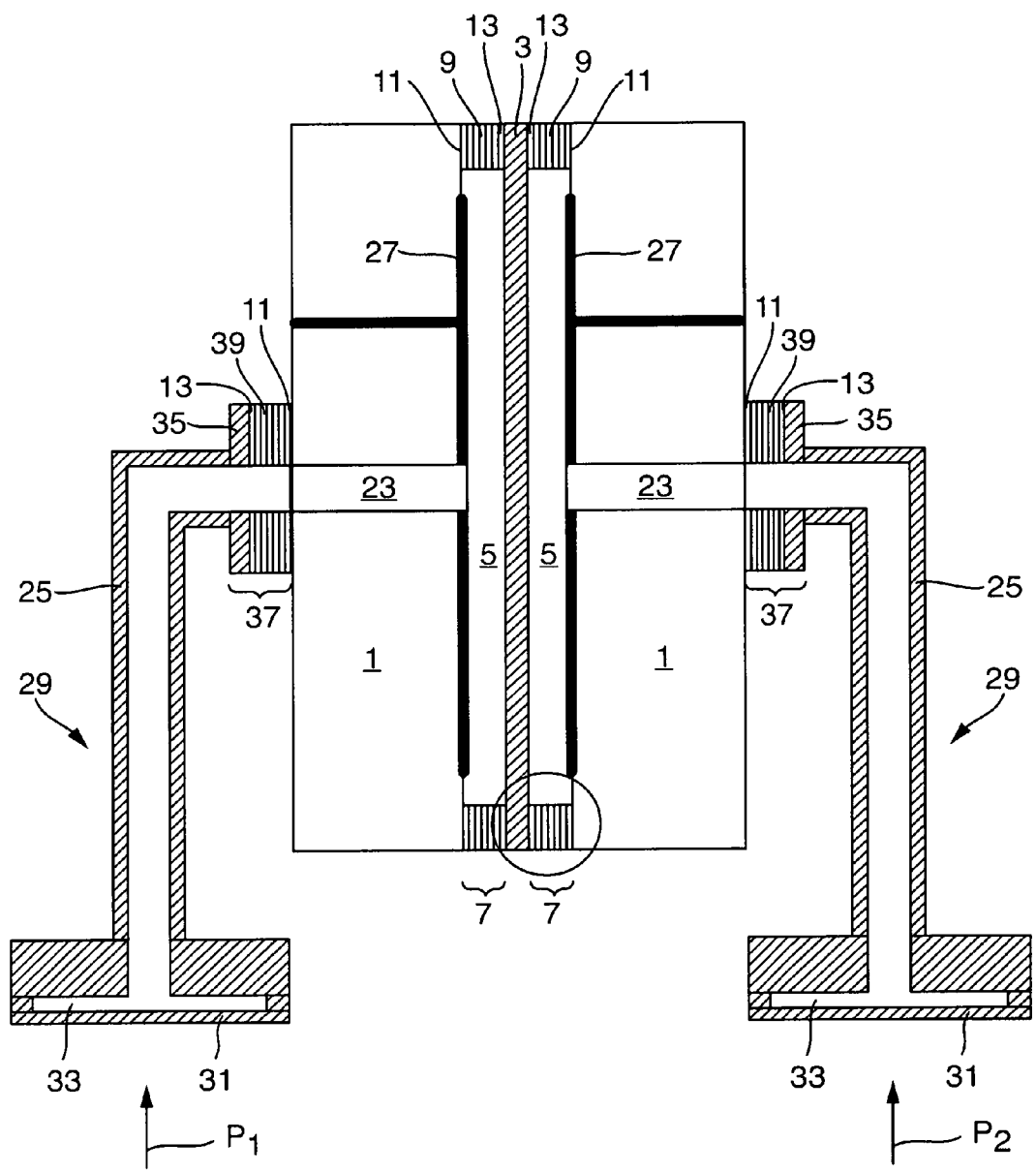
FIG. 1 is a pressure difference sensor of the invention.

FIG. 1 shows a first example of an embodiment of a pressure difference sensor of the invention, which has first and second, identical, ceramic platforms 1. The platforms 1 are composed, for example, of aluminum oxide ($Al_2O_3$). Alternatively, they can also be composed of another ceramic material, such as e.g. silicon carbide (SiC) or spinel.

Arranged between the two platforms 1 is a measuring membrane 3, under which in each of the two platforms 1, in each case, a pressure measuring chamber 5 is enclosed. In the example of an embodiment of FIG. 1, the measuring membrane 3 is composed of metal, for example, a stainless steel or a spring steel, and forms one of the metal bodies of the pressure difference sensor.

Figure 2:
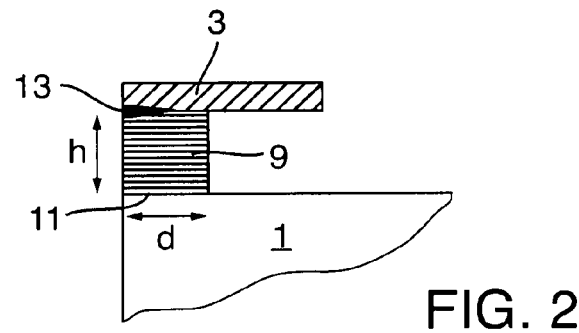
FIG. 2 is an enlargement of the pressure-tight connection circled in FIG. 1.

Measuring membrane 3 includes an outer edge, whose one side is connected via a first pressure-tight, mechanical connection 7 with an outer edge of the end of the first platform 1 facing the measuring membrane 3, and whose second side is connected via a second—preferably identically embodied—pressure-tight, mechanical connection 7 with an outer edge of the end of the second platform 1 facing the measuring membrane 3. Both connections 7 occur, in each case, via an adapting body 9 arranged between the measuring membrane 3 and the respective platform 1. FIG. 2 shows an enlarged representation of the pressure-tight connection 7 circled in FIG. 1. The two adapting bodies 9 are, in each case, annular, and have in the example of an embodiment illustrated in FIG. 1 a rectangular cross section.

According to the invention, the adapting bodies 9 have, in each case, a thermal expansion coefficient, which in direction extending from the respective platform 1 to the metal body—here thus from the respective platform 1 to the measuring membrane 3—rises from a coefficient of expansion corresponding to the thermal coefficient of expansion $\alpha_k$ of the ceramic of the platform 1 to a coefficient of expansion corresponding to the thermal coefficient of expansion $\alpha_M$ of the metal body.

For this, the adapting bodies 9 are preferably composed of a number N of layers $S_i$ of different composition arranged on top of one another. The individual layers $S_i$ extend parallel to one another and parallel to the measuring membrane 3. The compositions of the individual layers $S_i$ are predetermined in such a manner that the outermost layer $S_1$ adjoining the platform 1 has a thermal coefficient of expansion $\alpha_{S1}$, which corresponds to the coefficient of expansion $\alpha_K$ of the ceramic of the platform 1, and starting from this outermost layer $S_1$ the thermal coefficients of expansion rise from layer to layer step-wise in such a manner to the thermal coefficient of expansion $\alpha_M$ of the metal body that the outermost layer $S_N$ adjoining the measuring membrane 3 has a thermal coefficient of expansion $\alpha_{SN}$, which corresponds to the thermal coefficient of expansion $\alpha_M$ of the metal body—here thus the measuring membrane 3.

For this, each of the layers $S_i$ has a ceramic fraction, which is greater than or equal to 0% and less than or equal to 100%, and a metal fraction, which is greater than or equal to 0% and less than or equal to 100%. The fractions are preferably predetermined in such a manner that the ceramic fraction of the layers $S_i$ decreases from layer to layer in direction z extending from the platform 1 to the metal body, while the metal fraction of the layers $S_i$ increases from layer to layer in direction z extending from the platform 1 to the metal body. If one assigns the outermost layer $S_1$ of the adapting body 9 facing the respective platform 1 the coordinate z=0, and the outermost layer $S_N$ facing the measuring membrane 3 the coordinate z=h, wherein h equals the height of the adapting body 9, the ceramic fraction of a layer $S_i$ with the central axial coordinate z amounts, for example, to 100%×(1−z/h) and the metal fraction of this layer $S_i$ amounts to 100%×(z/h).

Preferably, the adapting bodies 9 are sintered bodies, whose layers $S_i$ are produced, for example, by laser sintering of powder layers of corresponding composition differing from layer to layer. Applied for this, can be, for example, the laser sinter method described in the IMW—Industriemitteilung (Industrial Report) No. 29 (2004) of Trenke with the title "Selektives Lasersintern von metallisch/keramischen Schichtstrukturen (Selective Laser Sintering of Metal/Ceramic Layer Structures)". The components can be provided for this in the form of microscale granular materials, whose grain size amounts to preferably no more than 20 μm and especially preferably no more than 10 μm. For preparing a layer, the coordinate-dependent mixture of the granular material is deposited on the already solidified layers and solidified by laser sintering. The desired composition of the respective layer $S_i$ can be produced by applying a powder layer containing metal powder and ceramic powder in the desired mixing ratio in mixed form and solidifying by laser sintering. Alternatively, the composition can be achieved by applying the corresponding amount of metal powder and the corresponding amount of ceramic powder, in each case, as a powder layer of corresponding thickness, on top of one another, and mixing and solidifying the two powder layers by laser sintering. In given cases, the sintered body can after transpired preparation be held under pressure at high temperature, in order to densify the structure.

The differences of the thermal coefficients of expansion $\alpha_{Si}$, $\alpha_{Si+1}$ of mutually adjoining layers $S_i$, $S_{i+1}$ of the adapting bodies 9 are smaller, the larger the number N of layers S is. The smaller these differences are, the smaller also are the temperature dependent stresses forming due to the different thermal coefficients of expansion. The number N of the layers is, consequently, predetermined as a function of the difference $\Delta\alpha=\alpha_M-\alpha_K$ of the thermal coefficients of expansion $\alpha_M$, $\alpha_K$ of the metal body and of the ceramic platform 1 to be fitted over the adapting body 9 step-wise relative to one another preferably in such a manner that the number N amounts to not less than $(\Delta\alpha)/(2\text{ ppm/K})$, especially not less than $(\Delta\alpha)/(1\text{ ppm/K})$ and preferably not less than $(2\Delta\alpha)/(1\text{ ppm/K})$.

Each adapting body 9 is connected with the associated platform 1 via a first joint 11 connecting its end facing the respective platform 1 with the outer edge of the platform 1, and with the metal body via a second joint 13 connecting its end facing the metal body with the metal body.

The first joint 11 between platform 1 and adapting body 9 is preferably implemented by constructing the adapting body 9 layer-wise on the platform 1. In such case, the laser sintering of the outermost layer $S_1$ on the respective platform 1 forms the first joint 11 between the platform 1 and the outermost layer $S_1$ facing the platform 1.

Alternatively, the adapting bodies 9 can be manufactured as separate components. In that case, the first joint 11 between platform 1 and adapting body 9 is formed preferably by an active hard soldered or brazed joint. The active hard soldered or brazed joint is preferably executed using a ternary active hard solder, or braze, having a Zr—Ni alloy and titanium. Such active hard solders, or brazes, are known from EP 0 490 807 A2, and have the advantage of a thermal coefficient of expansion matched to the thermal coefficient of expansion of the ceramic. Alternatively, the first joint 11 can be a glass soldered joint. The second joint 13 is preferably a welded joint. Alternatively, the second joint 13 can be an active hard soldered or brazed joint or a glass soldered joint.

The adapting bodies 9 have in cross section in a direction z extending parallel to the surface normal of the layers $S_i$ from the platform 1 to the measuring membrane 3 a height h and in a direction extending perpendicular to the surface normal of the layers $S_i$ a width d. The dimensions of the adapting body 9 are preferably predetermined in such a manner that the product of the ratio of the width d of the adapting body 9 to its height h and the magnitude of the difference $\Delta\alpha$ of the thermal coefficients of expansion $\alpha_K$, $\alpha_M$ of the platform 1 and the metal body to be connected therewith, here the measuring membrane 3, is less than a predetermined constant $\xi$ with the units 1/K, for which it holds that $\xi<0.1\%/K$, especially <500 ppm/K, preferably <250 ppm/K, further preferably <125 ppm/K and especially preferably <60 ppm/K:

$$\frac{d}{h}\cdot|\Delta\alpha|<\xi.$$

The constant $\xi$ is preferably determined as quotient of a dimensionless deformation parameter C and a temperature difference $\Delta T$ according to the formula:

$$\xi=\frac{C}{\Delta T},$$

wherein
  the temperature difference $\Delta T$ equals the difference $T_{max}-T_{min}$ of the maximum and minimum temperatures $T_{max}$, $T_{min}$, for which the pressure sensor is to be applied, and
  C is a dimensionless deformation parameter, for which it holds that C<4%, especially C<2% and preferably C<1%.

In such case, the individual layers $S_i$ of the adapting body 9 are preferably dimensioned in such a manner that the product of the ratio of the width $d_s$ of the respective layer $S_i$ to its layer thickness s and the magnitude of the difference $\Delta\alpha_s$ of the thermal coefficients of expansion $\alpha_{Si-1}$, $\alpha_{Si+1}$ of the layers $S_{i-1}$, $S_{i+1}$ adjoining such layers $S_i$ is likewise less than the above mentioned constant $\xi$ determined preferably as quotient of the dimensionless deformation parameter C and the temperature difference $\Delta T$. I.e.:

$$\frac{d_s}{s} \cdot |\Delta\alpha_s| < \xi$$

In such case, the individual layers $S_i$ have preferably a layer thickness s of not less than 10 μm, especially not less than 20 μm and preferably not less than 40 μm, and no greater than 400 μm, especially no greater than 200 μm and preferably no greater than 100 μm.

If one takes as an example a metal measuring membrane 3 of stainless steel with a thermal coefficient of expansion $\alpha_M$ of 16 ppm/K and a platform 1 of aluminum oxide ceramic with a thermal coefficient of expansion $\alpha_K$ of 8 ppm/K, then the difference $\Delta\alpha$ of the thermal coefficients of expansion amounts to 8 ppm/K. From this there results a preferred minimum number $N \geq 2 \Delta\alpha/(1 \text{ ppm/K})$ of 16 layers. In the case of the above set forth especially preferred layer thicknesses from 40 μm to 100 μm there results therefrom a preferred minimum height h of the adapting body 9 of 640 μm to 1.6 mm. If one starts from a temperature range of −40° C. to +130° C. for a temperature range in which the pressure sensor is to be applied, one obtains with application of the especially preferred deformation parameter C of 1% for the constant according to $\xi=C/\Delta T$ a value of 58.88 ppm/K. Therewith, the width d of the adapting body 9 calculable via the above provided design rule d/h $|\Delta\alpha|<\xi$ in the case of a height h of 640 μm lies preferably below 4.8 mm.

Alternatively, the adapting body 9 can be a sintered body manufactured by sintering a green body manufactured in a screen printing process. The manufacture of the green body occurs by printing the individual layers in sequentially executed printing processes on top of one another, wherein the printed layers are, in each case, e.g. solidified by drying, before the next layer is printed on top.

The adapting body 9 manufactured in the screen printing process has preferably layers having a layer thickness in the order of magnitude of a few micrometers.

Three-dimensional sintered bodies produced by sintering green bodies manufactured in the screen printing process and composed of layers of different composition arranged on top of one another are described, for example, in EP 0 627 983 B1. Moreover, the handout for a presentation with the title: '3D-Screen Printing, A Method For Component Manufacture' by Mr. Riecker of IFAM Fraunhofer Gesellschaft given at the Ninth Seminar for Current Trends in the Packaging of Integrated Circuits held in Dresden 2 and 3 Jul. 2014 describes a three-dimensional, graded structure of steel and ceramic, whose ceramic fraction decreases continuously in a spatial direction, and whose steel fraction correspondingly increases in the same spatial direction.

The adapting body 9 manufactured in this way can exactly as in the case of the preceding example of an embodiment be constructed of layers of different composition arranged on top of one another, whose ceramic fraction decreases from layer to layer in direction extending from the platform 1 to the metal body, and whose metal fraction increases in direction extending from layer to layer from the platform 1 to the metal body. For these forms of embodiment, the above set forth design data for the number of layers N, the ratio of the width d of the adapting body 9 to its height h, as well as the ratio of the width $d_s$ of the individual layers to their layer thickness s hold correspondingly, wherein the design data here refer to the dimensions present after the sintering of the green body.

Alternatively, the adapting body 9 can have layer sequences arranged on top of one another, which are layers arranged on top of one another, which, in each case, are either exclusively of metal or exclusively of ceramic. In such case, the number of layers consisting exclusively of ceramic in the individual layer sequences and the number of layers consisting exclusively of metal in the individual layer sequences is predetermined in such a manner that the ceramic fraction of the layer sequences in direction extending from the platform 1 to the metal body decreases from layer sequence to layer sequence, and the metal fraction of the layer sequences in direction z extending from the platform 1 to the metal body increases from layer to layer. In such case, the layers have preferably an as low as possible thickness, especially a thickness in the order of magnitude of a few micrometers, especially 2 μm to 3 μm. This form of embodiment offers the advantage that only two different printing pastes, namely a ceramic paste and a metal paste, are required for producing the green body, and that for printing the ceramic and metal layers, in each case, only one screen is required, which does not have to be cleaned between sequentially following printing procedures.

In connection with adapting bodies 9 manufactured in the screen printing process, the first and second joints 11, 13 are preferably produced by arranging the green body between platform 1 and metal body and sintering it there.

The invention offers the advantage that the adapting body 9 adapts the different thermal coefficients of expansion of metal body and platform 1 step-wise to one another. This effects a marked reduction of temperature related stresses in the region of the joints 11, 13 and in the region of the measuring membrane 3. Therewith, it is possible to use stainless steel as material of the measuring membrane 3, without the danger that the joints 11, 13 will be loaded excessively or even break due to temperature related stresses, and without the accuracy of measurement being significantly degraded by temperature dependent warping in the region of the measuring membrane 3.

Figure 3:
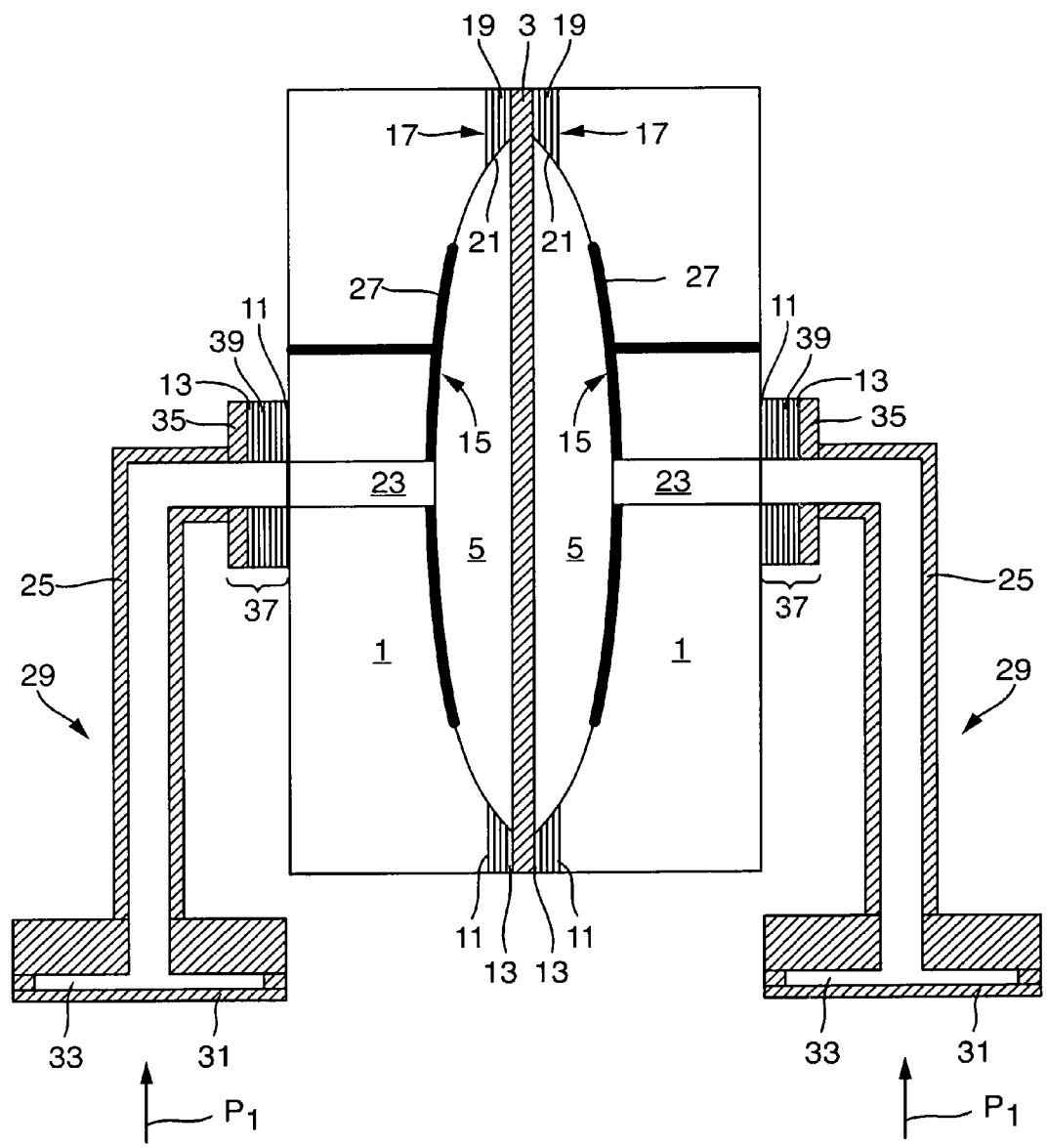
FIG. 3 is the pressure difference sensor of FIG. 1 with membrane bed integrated in the platform and continued outwardly by the adapting body.

FIG. 3 shows a further example of an embodiment of a pressure difference sensor of the invention. Since this embodiment is mainly the same as the example of an embodiment illustrated in FIG. 1, only differences will be explained in detail, and otherwise reference is made to the description of FIG. 1. In contrast to the example of an embodiment illustrated in FIG. 1, the two platforms 1 here have on their ends facing the measuring membrane 3, in each case, a region formed as a membrane bed 15. The membrane beds 15 serve to support the measuring membrane 3 in the case of an overload acting thereon and have for this purpose a surface contour replicating the bending contour of the measuring membrane 3. Each membrane bed 15 is surrounded externally by a planar edge 17 of the end of the respective platform 1 extending parallel to the measuring membrane 3, on which edge also here, in each case, an adapting body 19 is arranged.

In connection with platforms 1 equipped with membrane beds 15, the adapting bodies 19 have preferably an inner contour 21 externally surrounding the respective pressure measuring chamber 5. The inner contours 21 outwardly continue the respective membrane beds 15. For this, the adapting body 19 can be constructed of washer shaped layers $S_i$ of equal outer diameters, whose inner diameters increase from that of the outermost layer $S_1$ facing the platform 1 from layer to layer corresponding to the bending contour of the measuring membrane 3. In such case, the above cited design rules for the number N of layers $S_i$ as well as for the layer thickness s and the width $d_s$ of the layers $S_i$ hold correspondingly.

In both examples of embodiments, each of the two platforms 1 has a traversing bore 23 opening into the associated pressure measuring chamber 5 and extending through the respective platform 1 to its rear side facing away from the measuring membrane 3. In measurement operation, the first side of the measuring membrane 3 facing the first platform 1 is supplied via a pressure supply line 25 connected to the bore 23 in the first platform 1 with a first pressure $p_1$, and the second side of the measuring membrane 3 facing the second platform 1 is supplied via a pressure supply line 25 connected to the bore 23 in the second platform 1 with a second pressure $p_2$. These pressures effect a deflection of the measuring membrane 3 dependent on the difference between the first and the second pressures $p_1$, $p_2$. This deflection is metrologically registered by means of an electromechanical transducer and converted into a measurement signal dependent on the difference between the pressures $p_1$, $p_2$.

Suited as transducer in both examples of embodiments is e.g. a capacitive transducer, which has a first capacitor formed by the metal measuring membrane 3 and a counter electrode 27 arranged in the first platform 1, and a second capacitor formed by the metal measuring membrane 3 and a counter electrode 27 arranged in the second platform 1. Each of the capacitors has a capacitance dependent on the deflection of the measuring membrane 3 and determinable e.g. by means of capacitance measurement circuits (not shown) and associable, based on a characteristic curve ascertained earlier in a calibration procedure, with a pressure difference Δp to be measured, acting on the measuring membrane 3.

The pressure supply lines 25 can be, for example, components of pressure transfer means 29 connected in front of the pressure measuring chambers 5. The two pressure transfer means 29 comprise, in each case, a pressure receiving chamber 33 closed outwardly by an isolating diaphragm 31 and connected via the pressure supply line 25 connected thereto and the bore 23 to the associated pressure measuring chamber 5. In such case, the pressure measuring chambers 5, the bores 23, the pressure supply lines 25 and the pressure receiving chambers 33 are filled with a pressure transmitting liquid, via which the pressures $p_1$, $p_2$ acting externally on the associated isolating diaphragms 31 are transmitted to the associated pressure measuring chambers 5.

The pressure supply lines 25 have on their ends facing the respective platforms 1 terminations 35 of metal, e.g. of a stainless steel. The terminations 35 are metal bodies, which are connected with the associated platforms 1 via pressure-tight, mechanical connections 37. The terminations 35 are, for example, metal washers mounted on the ends of the pressure supply lines 25 and having passageways corresponding to the inner diameter of bore 23 and pressure supply line 25. Also these connections 37 occur, in each case, via an adapting body 39 arranged between the respective platform 1 and the termination 35 and having a thermal expansion coefficient, which rises in direction extending from the platform 1 to the metal body—here to the termination 35—from the coefficient of expansion corresponding to the thermal coefficient of expansion $\alpha_k$ of the platform 1 to the coefficient of expansion corresponding to the thermal coefficient of expansion $\alpha_M$ of the termination 35.

The adapting bodies 39 have, in each case, an interior, which connects an interior of the thereon following bore 23 via the passageway of the termination 35 with an interior of the pressure supply line 25. The adapting bodies 39 have, in each case, an end facing the respective platform 1, which is connected by a first joint 11 with a region of the rear side of the respective platform 1 surrounding the bore 23, and an end facing away from the platform 1 and connected by a second joint 13 with the end of the termination 35 facing the platform 1. The first and second joints 11, 13 are preferably embodied identically to the corresponding first and second joints 11, 13 described based on FIG. 1.

These adapting bodies 39 are, apart from their inner diameters matched to the inner diameter of bores 23 and terminations 35, and their outer diameters matched to the outer diameter of the terminations 35, constructed in the manner described in connection with the adapting bodies 9 of FIG. 1. In such case, the above design rules for the number N of the layers $S_i$, height h and width d of the adapting bodies 39, as well as layer thickness s and width $d_s$ of the layers $S_i$ hold correspondingly.

Figure 4:
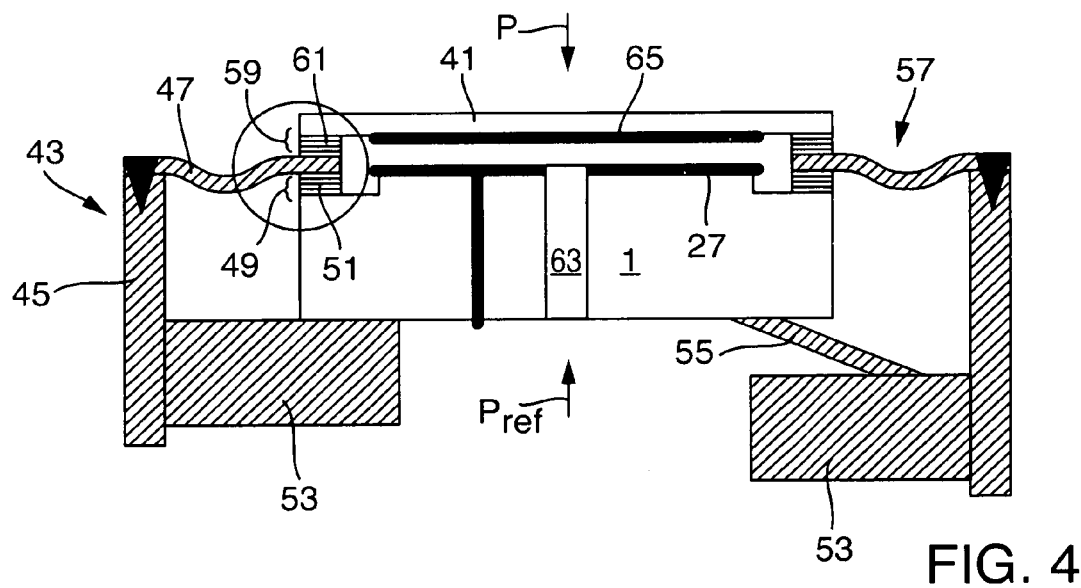
FIG. 4 is a relative pressure sensor of the invention.
Figure 5:
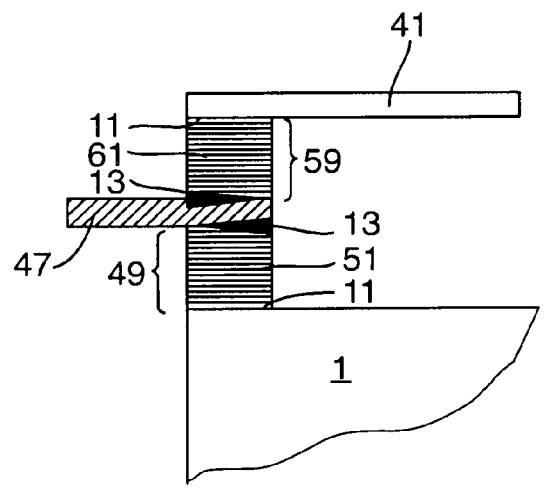
FIG. 5 is an enlargement of the pressure-tight connections circled in FIG. 4.

FIG. 4 shows a further embodiment of an embodiment of a pressure sensor of the invention. FIG. 5 shows an enlargement of the detail of FIG. 4 circled in FIG. 4. Also this pressure sensor includes a ceramic platform 1 and a measuring membrane 41 arranged on the platform 1 with enclosure of a pressure measuring chamber 5. Measuring membrane 41 is composed of ceramic. Preferably used for this is the same material, of which also the platform 1 is composed, especially aluminum oxide ($Al_2O_3$), silicon carbide ceramic (SiC) or spinel.

The ceramic platform 1 is arranged in a metal housing 43, which includes a housing segment 45 externally enclosing the platform 1 on all sides and spaced from the platform 1. Provided on the end of the housing segment 45 is a radially inwardly extending shoulder 47. Shoulder 47 is composed of metal, for example, stainless steel. Shoulder 47 is, thus, a metal body, which with the ceramic platform 1 is connected by a pressure-tight, mechanical connection 49. Also this connection 49 occurs via an adapting body 51 in the manner already described above in connection with the connection 7 illustrated in FIG. 1, wherein the inner edge of the shoulder 47 is present instead of the outer edge of the metal measuring membrane 3 of FIG. 1. With reference to the adapting body 51, especially its thermal coefficient of expansion, its construction and its dimensions, the above explanations for the adapting body 9 illustrated in FIG. 1 hold correspondingly. Adapting body 51 is also here an annular adapting body 51 of rectangular cross section, whose end facing the platform 1 is connected via a first joint 11 with the outer edge of the end of the platform 1 facing the measuring membrane 41, and whose end facing the shoulder 47 is connected via a second joint 13 with the side of the inner edge of the shoulder 47 facing the platform 1 and directed into the housing 43. Also, the first and second joints 11, 13 are preferably embodied identically to the first and second joints 11, 13 described based on FIG. 1.

Preferably, the outer edge of the platform 1 is clamped in the axial direction, i.e. parallel to the surface normal to the measuring membrane 41, into the housing 43. For this, shoulder 47 is preferably embodied as an element elastic in the axial direction, which interacts with an abutment 53 provided in the housing segment 45 on the side away from the measuring membrane 41. Suited as abutment 53 is, for example, a hollow cylindrical bearing ring, which is screwed into the housing 43 in such a manner that its end facing in the direction of the measuring membrane 41 bears against an outer edge of the rear side of the platform 1 facing away from the measuring membrane 41, and presses the platform 1 toward the resilient shoulder 47. This variant is shown in the left half of FIG. 4. Additionally, a clamping spring 55 can be provided between the abutment 53 and the outer edge of the platform 1. This variant is shown in the right half of FIG. 4.

The elastic behavior of shoulder 47 can be achieved e.g. by a corresponding forming of the shoulder 47. Elastic behavior of the shoulder 47 effective in the axial direction can be effected e.g. via a reduced thickness of the shoulder 47 matched correspondingly to a stiffness of the metal of the shoulder 47.

Preferably, shoulder 47 is embodied as an elastic element in the radial direction, thus perpendicular to the surface normal of the measuring membrane 41. Also, the elasticity of the shoulder 47 acting in the radial direction can be achieved by a corresponding forming of the shoulder 47. For this, the shoulder 47 is preferably embodied as a wave-shaped washer, which has at least one annular wave 57 embodied concentrically to the surface normal of the measuring membrane 41 extending through the center of the measuring membrane 41.

Shoulder 47 is composed both as regards the preferred elasticity, as well as also as regards its exposed position as part of the housing 43 of the pressure sensor, preferably of a resilient stainless steel. Especially suited for this are nickel containing, austenitic, stainless steels, such as e.g. stainless steel with the designation 1.4404, respectively 316L.

Measuring membrane 41 is arranged on the platform 1 and encloses the pressure measuring chamber 5. For this, the outer edge of the measuring membrane 41 is connected via another pressure-tight, mechanical connection 59 with the inner edge of the shoulder 47 connected via the pressure-tight, mechanical connection 49 with the edge of the platform 1. Also connection 59 occurs in the manner described based on the connection 7 in FIG. 1. For this, a further adapting body 61 is arranged between the inner edge of the shoulder 47 and the outer edge of the measuring membrane 41. The further adapting body 61 is preferably embodied identically to adapting body 51, and arranged in such a manner on the shoulder 47 that its thermal expansion coefficient starting from the coefficient of expansion of the outermost layer $S_1$ adjoining the measuring membrane 41 corresponding to the coefficient of expansion $\alpha_K$ of the measuring membrane 41 rises in the direction of the shoulder 47 from layer to layer step-wise in such a manner that its outermost layer $S_N$ bordering on the metal shoulder 47 has a thermal coefficient of expansion corresponding to the thermal coefficient of expansion $\alpha_M$ of the metal shoulder 47.

Analogously to the above described connections 7, the outer edge of the measuring membrane 41 facing the platform 1 is connected by a first joint 11 with an end of the additional adapting body 61 facing away from the platform 1, and the inner edge of the shoulder 47 facing the measuring membrane 41 is connected by a second joint 13 with an end of the additional adapting body 61 facing the shoulder 47. The first and second joints 11, 13 are also here preferably embodied identically to the corresponding first and second joints 11, 13 described based on FIG. 1.

In such case, the shoulder 47, which is resilient in the radial and preferably also in the axial direction, offers the advantage that it relieves temperature dependent, residual stresses remaining, in given cases, in spite of the matching of the thermal coefficients of expansion $\alpha_K$, $\alpha_M$ via the adapting bodies 51 and 61.

The pressure sensor shown in FIG. 4 is embodied as a relative pressure sensor. For this, it includes a bore 63 extending through the platform 1 and opening into the pressure measuring chamber 5, via which the pressure measuring chamber 5 is fed a reference pressure $p_{ref}$, e.g. atmospheric pressure, against which the pressure to be measured should be referenced. Alternatively, it can be embodied as an absolute pressure sensor. In that case, bore 63 is absent, and the pressure measuring chamber 5 enclosed under the measuring membrane 41 is evacuated.

A pressure p acting externally on the measuring membrane 41 effects a pressure-dependent deflection of the measuring membrane 41, which is registered by means of an electromechanical transducer. Also here, a capacitive transducer can be applied as transducer, which here includes an electrode 65 applied on the inner side of the measuring membrane 41 and forming together with the counter electrode 27 applied on the end of the platform 1 facing the measuring membrane 41 a capacitor, which has a capacitance dependent on the pressure dependent deflection of the measuring membrane 41.

The invention claimed is:

1. A pressure sensor, comprising:
a platform of ceramic;
a measuring membrane arranged on said platform;
a pressure measuring chamber enclosed in said platform under said measuring membrane; and
at least one metal body connected with said platform via a pressure-tight, mechanical connection, wherein:
said pressure-tight mechanical connection includes an adapting body arranged between said platform and said metal body;
said adapting body has a thermal expansion coefficient, which rises along said adapting body in a direction extending from said platform to said metal body from a coefficient of expansion corresponding to a thermal coefficient of expansion of the ceramic of said platform to a coefficient of expansion corresponding to the thermal coefficient of expansion of said metal body; and
said adapting body is connected by a first joint with said platform and by a second joint with said metal body.

2. The pressure sensor as claimed in claim 1, wherein:
said adapting body has layers of different composition arranged on top of one another, and applied on top of one another by laser sintering of powder layers containing metal and/or ceramic fractions; and
said layers have a ceramic fraction, which is greater than or equal to 0% and less than or equal to 100%, and a metal fraction, which is greater than or equal to 0% and less than or equal to 100%;
the ceramic fraction decreases from layer to layer in a direction extending from said platform to said metal body; and
the metal fraction rises from layer to layer in the direction extending from said platform to said metal body.

3. The pressure sensor as claimed in claim 1, wherein:
said adapting body is a sintered body constructed of layers, and the first joint is a joint formed by sintering, especially by laser sintering, to said platform an outermost layer of said adapting body facing said platform, or
the first joint is an active hard soldered or brazed joint, especially an active hard soldered or brazed joint formed by means of a ternary active hard solder or braze having a Zr—Ni alloy and titanium; or the first joint is a glass soldered joint.

4. The pressure sensor as claimed in claim 1, wherein:

the second joint is a welded joint or a glass soldered joint.

5. The pressure sensor as claimed in claim 1, wherein:

said measuring membrane is composed of metal and is one of the metal bodies; and an outer edge of an end of said platform facing said, measuring membrane is connected via the first joint, said adapting body and the second joint with an outer edge of the side of said measuring membrane facing said platform.

6. The pressure sensor as claimed in claim 5, wherein:

said adapting body is an annular adapting body of rectangular cross section; or an end of said platform facing said measuring membrane includes a region formed as a membrane bed; and said adapting body includes an inner contour, which externally surrounds said pressure measuring chamber and by which the membrane bed is outwardly continued.

7. The pressure sensor as claimed in claim 1, wherein:

a traversing bore is provided in said platform, opening into said pressure measuring chamber;

a pressure supply line is provided connected to said traversing bore;

a pressure supply line has on its end facing said platform a metal termination having a passageway and forming one of the metal bodies, said platform is connected via said first joint, said adapting body and said second joint with said termination; and said adapting body has an interior, through which an interior of said bore is connected via the passageway in said noted termination with an interior of said pressure supply line.

8. The pressure sensor as claimed in claim 1, wherein:

said platform is arranged in a housing, the housing includes a housing segment externally enclosing said platform and spaced from said platform, and a shoulder connected with said housing segment, extending radially inwardly, and forming one of the metal bodies of metal, and an inner edge of said shoulder is connected via said pressure-tight connection with an outer edge of said platform facing said shoulder;

an end of said adapting body facing said platform is connected via said first joint with an outer edge of the end of said platform facing said shoulder; and an end of said adapting body facing said shoulder is connected via said second joint with a side of an inner edge of said shoulder, which side faces into said housing.

9. The pressure sensor as claimed in claim 8, wherein:

said measuring membrane is composed of ceramic;

an outer edge of said measuring membrane is connected via a pressure-tight connection with a side of the inner edge of said shoulder, which side faces away from said platform;

said pressure-tight connection occurs via an additional adapting body, especially an additional adapting body formed identically to said adapting body arranged between said platform and said shoulder;

said additional adapting body has a thermal expansion coefficient, which in direction extending from said measuring membrane to said shoulder rises from a coefficient of expansion corresponding to a thermal coefficient of expansion ($\alpha_M$) of the ceramic of the measuring membrane to a coefficient of expansion corresponding to the thermal coefficient of expansion ($\alpha_M$) of the metal of the shoulder; and said additional adapting body has an end facing said measuring membrane and connected with said measuring membrane by an additional first joint, and an end facing said shoulder and connected with said shoulder by an additional second joint.

10. The pressure sensor as claimed in claim 8, wherein:

said shoulder is elastic in a direction extending parallel or perpendicular to the surface normal to said measuring membrane.

11. The pressure sensor as claimed in claim 1, wherein:

said adapting body is an adapting body constructed of layers;

a number (N) of said layers is greater than or equal to a difference between the thermal coefficient of expansion of said metal body and the thermal coefficient of expansion of said ceramic platform divided by 2 ppm/K.

12. The pressure sensor as claimed in claim 1, wherein:

said adapting body is an adapting body constructed of layers; and said layers have a layer thickness of not less than 10 μm, especially not less than 20 μm.

13. The pressure sensor as claimed in claim 1, wherein:

said adapting body has in a direction extending from said platform to said metal body a height, and perpendicular thereto a width;

a product of a ratio of said width of said adapting body to said height of said adapting body and the magnitude of the difference between the thermal coefficients of expansion of the ceramic of said platform and the metal of said metal body is less than a constant ($\xi$) of units 1/K, wherein said constant ($\xi$) is less than 0.1%/K; and/or said constant ($\xi$) equals a quotient of a dimensionless deformation parameter and a temperature difference between a maximum and a minimum temperature, for which the pressure sensor is to be applied, and the deformation parameter is less than 4%.

14. The pressure sensor as claimed in claim 1, wherein:

said adapting body is an adapting body constructed of layers arranged on top of one another;

said individual layers, in each case, have a layer thickness extending parallel to the surface normal of the layer and a width extending perpendicular to the surface normal of the layer; and the product of the ratio of the width of the respective layer to its layer thickness and the magnitude of the difference between the thermal coefficients of expansion of the layers adjoining this layer is less than a constant ($\xi$) with the units 1/K;

said constant ($\xi$) is less than 0.1%/K; and/or said constant ($\xi$) equals a quotient of a dimensionless deformation parameter and a temperature difference between a maximum and a minimum temperature, for which the pressure sensor is to be applied, and the deformation parameter is less than 4%.

15. The pressure sensor as claimed in claim 1, wherein:

said adapting body:

is a sintered body manufactured by sintering a green body manufactured in a screen printing process, and is composed of layers arranged on top of one another;

which have either a ceramic fraction lessening from layer to layer in the direction extending from said platform to said metal body and a metal fraction increasing from layer to layer in the direction extending from said platform to said metal body; or which are arranged on top of one another in layer sequences either exclusively of metal or exclusively of ceramic, wherein a number of the layers in the individual layer sequences containing exclusively ceramic and a number of the layers in the individual layer sequences containing exclusively metal is predetermined in such a manner that a ceramic fraction of the layer sequences decreases from layer sequence to layer sequence in the direction extending from said platform to said metal body and a metal fraction of the layer sequences rises from layer to layer in the direction extending from said platform to said metal body.

16. The pressure sensor as claimed in claim 1, said first and said second joints are joints produced by sintering of the green body arranged between said platform and metal body.

17. A method for manufacture of an adapting body of a pressure sensor, comprising: a platform of ceramic; a measuring membrane arranged on said platform; a pressure measuring chamber enclosed in said platform under said measuring membrane; and at least one metal body connected with said platform via a pressure-tight, mechanical connection, wherein: said pressure-tight mechanical connection includes an adapting body arranged between said platform and said metal body; said adapting body has a thermal expansion coefficient, which rises along said adapting body in a direction extending from said platform to said metal body from a coefficient of expansion corresponding to a thermal coefficient of expansion of the ceramic of said platform to a coefficient of expansion corresponding to the thermal coefficient of expansion of said metal body; and said adapting body is connected by a first joint with said platform and by a second joint with said metal body, the method comprising the steps of:

producing the individual layers by applying a powder layer in mixed form containing metal powder and ceramic powder in a mixing ratio corresponding to the composition of the respective layer, and solidifying by laser sintering; or producing individual layers by applying an amount of metal powder corresponding to the composition of the respective layer and an amount of ceramic powder corresponding to the composition of the respective layer, in each case, as powder layers one on top of the other; and the two powder layers are mixed and solidified by laser sintering.

18. The pressure sensor as claimed in claim 1, wherein: said adapting body has layers of different composition arranged on top of one another, a ceramic fraction of said layers decreases from layer to layer in a direction extending from said platform to said metal body; and a metal fraction of said layers rises from layer to layer in the direction extending from said platform to said metal body.

19. The pressure sensor as claimed in claim 1, wherein: said adapting body has layers of different composition arranged on top of one another, said layers applied on top of one another by laser sintering of powder layers containing metal and/or ceramic fractions; and said layers have a ceramic fraction, which is greater than or equal to 0% and less than or equal to 100%, and a metal fraction, which is greater than or equal to 0% and less than or equal to 100%; the ceramic fraction decreases from layer to layer in a direction extending from said platform to said metal body; and the metal fraction rises from layer to layer in the direction extending from said platform to said metal body.

20. The pressure sensor as claimed in claim 9, wherein: said metal comprises stainless steel.

21. The pressure sensor as claimed in claim 10, wherein: said stainless steel comprises nickel containing austenitic, stainless steel.

22. The pressure sensor as claimed in claim 9, wherein: said shoulder is elastic in direction extending perpendicular to the surface normal to said measuring membrane.

23. The pressure sensor as claimed in claim 9, wherein: said shoulder is elastic in direction extending parallel and perpendicular to the surface normal to said measuring membrane.

24. The pressure sensor as claimed in claim 1, wherein: said adapting body is an adapting body constructed of layers; a number (N) of said layers is greater than or equal to a difference between the thermal coefficient of expansion of said metal body and the thermal coefficient of expansion of said ceramic platform divided by 1 ppm/K.

25. The pressure sensor as claimed in claim 1, wherein: said adapting body is an adapting body constructed of layers; a number (N) of said layers is greater than or equal to twice a difference between the thermal coefficient of expansion of said metal body and the thermal coefficient of expansion of said ceramic platform divided by 1 ppm/K.

26. The pressure sensor as claimed in claim 1, wherein: said adapting body is an adapting body constructed of layers; and said layers have a layer thickness of not less than 20 μm and no greater than 200 μm.

27. The pressure sensor as claimed in claim 1, wherein: said adapting body is an adapting body constructed of layers; and said layers have a layer thickness of not less than 40 μm and no greater than 100 μm.

28. The pressure sensor as claimed in claim 22, wherein: said constant ($\xi$) is less than 250 ppmK.

29. The pressure sensor as claimed in claim 22, wherein: said constant ($\xi$) is less than 60 ppm/K.

30. The pressure sensor as claimed in claim 1, wherein: said adapting body has in a direction extending from said platform to said metal body a height, and perpendicular thereto a width; a product of a ratio of said width of said adapting body to said height of said adapting body and the magnitude of the difference between the thermal coefficients of expansion of the ceramic of said platform and the metal of said metal body is less than a constant ($\xi$) of units 1/K, wherein said constant ($\xi$) equals a quotient of a dimensionless deformation parameter and a temperature difference between a maximum and a minimum temperature, for which the pressure sensor is to be applied, and the deformation parameter is less than 4%.

31. The pressure sensor as claimed in claim 25, wherein: said deformation parameter is less than 2%.

32. The pressure sensor as claimed in claim 25, wherein: said deformation parameter is less than 1%.

33. The pressure sensor as claimed in claim 27, wherein: said constant ($\xi$) is less than 250 ppm/K.

34. The pressure sensor as claimed in claim 27, wherein: said constant ($\xi$) is less than 60 ppm/K.

35. The pressure sensor as claimed in claim 1, wherein:

said adapting body is an adapting body constructed of layers arranged on top of one another; said individual layers, in each case, have a layer thickness extending parallel to the surface normal of the layer and a width extending perpendicular to the surface normal of the layer; and the product of the ratio of the width of the respective layer to its layer thickness and the magnitude of the difference between the thermal coefficients of expansion of the layers adjoining this layer is less than a constant ($\xi$) with the units 1/K; said constant ($\xi$) equals a quotient of a dimensionless deformation parameter and a temperature difference between a maximum and a minimum temperature, for which the pressure sensor is to be applied, and the deformation parameter is less than 4%.

36. The pressure sensor as claimed in claim 30, wherein: said deformation parameter is less than 2%.

37. The pressure sensor as claimed in claim 30, wherein: said deformation parameter is less than 1%.

38. The pressure sensor as claimed in claim 33, wherein: said layers have a layer thickness in the order of magnitude of a few micrometers.

39. The pressure sensor as claimed in claim 12, wherein: said additional first joint is formed by sintering an outer layer of said adapting body to said measuring membrane.

40. The pressure sensor as claimed in claim 12, wherein: said additional second joint is a welded joint.

* * * * *